United States Patent Office 3,201,487
Patented Aug. 17, 1965

3,201,487
AROMATIC ALKYLATION WITH A SILICA-ALUMINA-CHROMIA CATALYST
Stephen M. Kovach, Highland, Ind., and Glenn C. Michaels, Park Forest, Ill., assignors to Sinclair Research, Inc., Wilmington, Del., a corporation of Delaware
No Drawing. Filed Sept. 19, 1961, Ser. No. 139,056
5 Claims. (Cl. 260—671)

This invention relates to the alkylation of aromatics with alkylating agents and is particularly concerned with a catalytic alkylation process and a hydrocarbon conversion catalyst consisting essentially of chromia on a silica catalytic support. Alkylated aromatics are of value in many fields and some are particularly desirable as constituents of high octane aviation fuels and as sources of synthetic detergents.

Although catalytic processes for the alkylation of aromatics have been suggested, the present process provides good utilization of alkylating agents, low carbon laydown on the catalyst, good catalyst aging characteristics, low disproportionation or isomerization, and a readily regenerable catalyst. The alkylation is accomplished in the present process by employing a particularly effective catalyst which includes chromia in catalytic amounts generally from about 20 to 50, preferably from about 25 to 40, weight percent on a silica base.

The silica base of the catalyst of the present invention generally includes a minor amount of alumina, for instance about 1 to 48, preferably about 10 to 25 weight percent alumina based on the silica-alumina. The base can include minor amounts of other ingredients, particularly acidic promoters. Thus, the catalyst base can contain halogen, e.g., chlorine or fluorine, usually in amounts of from about 0.1 to 3 percent by weight, or it can be composed of mixtures of silica-alumina with or without acidic promoters, for example, metal oxides such as magnesia and boria, the total amount of such promotors generally not exceeding about 10 percent by weight, for instance about 0.1 or 5 weight percent. Suitable silica-aluminas include, for instance, those disclosed in U.S. Patents Nos. 2,384,505 and 2,542,190, hereby incorporated by reference, clay catalysts and acidic solid oxide hydrocarbon cracking catalysts. The preferred catalysts are the synthetic gel type silica-alumina, such as coprecipitated alumina-silica and alumina precipitated on silica. Popular synthetic gel cracking catalysts generally contain about 10 to 30% alumina. Two such catalysts are "Aerocat" which contains about 13% to $Al_2O_3$, and "High Alumina Nalcat" which contains about 25% $Al_2O_3$, with substantially the balance being silica. The catalyst may be only partially of synthetic material; e.g., as may be made by precipitation of silica-alumina on an activated clay. One example of such catalysts contains about equal amounts of silica, alumina gel and clay.

The chromia can be added to the silica-containing support, by known procedures involving impregnation using a water soluble salt of the catalytic component or by coprecipitation. Suitable water-soluble compounds include chromium nitrate, chromic acid and chromium chloride. When employing the impregnation procedure, after impregnation, the resulting impregnated product is dried generally at a temperature within the range of about 170° F. to 400° F. for at least about 6 hours and up to about 24 hours or more with a slow stream of air circulated to carry off the water vapor. The dried silica-alumina catalyst mixture then may be formed by a tabletting or extruding operation. If the catalyst is to be in finely divided form, a grinding operation may follow drying. In the case of tabletting it is customary to incorporate a die lubricant which advantageously is organic and can be burned out by oxidation in the calcination step.

The dried pellets are suitable for subjection to high temperature treatment or calcination at a temperature between about 500° F. and about 1500° F., usually between about 700° F. and 1000° F., for instance, for a period of between about 2 and about 36 hours. It is generally preferred that the calcining operation be conducted in a manner minimizing contact time of the silica-alumina-containing product with water vapor at the high temperatures encountered. The product after drying generally contains a substantial amount of water which is driven off at temperatures above about 400° F. While the calcination or heat treatment will generally be conducted in air, it is also feasible, although generally less desirable, to carry out the same in other oxidizing atmospheres, a reducing atmosphere such as for example, hydrogen or methane, or an inert atmosphere, such as nitrogen. In some instances, it may be desirable to carry out the calcination initially in a blend of air and nitrogen. The silica-alumina impregnated with the catalytically active components, is finally cooled to yield the finished product.

The catalyst employed in the process of the present invention can be easily regenerated employing conventional procedures, for instance, by subjecting it to an oxygen-containing gas at temperatures sufficient to burn off carbon deposited on the catalyst during the alkylation. This oxygen-containing gas, e.g., an oxygen-nitrogen mixture, can contain about 0.01 weight percent to 5 weight percent oxygen but preferably contains about 0.5 to 1.5 weight percent oxygen and is introduced at a flow rate such that the maximum temperature at the site of combustion is below about 1000° F.

In accordance with the present invention, the above described catalysts are advantageously employed to alkylate alkylatable aromatics with an alkylating agent under alkylation conditions. The alkylation reaction conditions used in the method of the present invention preferably include a temperature sufficient to maintain the aromatic and alkylating agent feeds in the vapor phase under the pressure employed. The temperature may be from about 400 to 1000° F., preferably from about 500 to 800° F. while the pressure may range from about ambient pressures or less up to about 2000 p.s.i.g., e.g., about 0 to 2000 p.s.i.g., and are preferably elevated presures ranging from about 0 to 1000 p.s.i.g. The catalyst can be used as a fixed, moving or fluidized bed or in any other convenient type of handling system. The aromatic space velocity will in most cases be from about 0.1 to 10, preferably from about 0.1 to 5, weights of aromatic per weight of catalyst per hour (WHSV). The alkylating agent is generally employed in a molar ratio to the aromatic of about 0.1 to 4:1 and preferably of about 1 to 2:1. Specific illustrations include a methanol to aromatic ratio generally of about 1:4 to 4:1, preferably about 1 to 4:4 and a dimethylether ratio generally of about 1:8 to 2:1, preferably about 1 to 8:8. Diluent gases, e.g., inert of hydrocarbon, such as $H_2$, $N_2$ and $CH_4$ can also be utilized in the present process usually in the amounts ranging from a diluent gas to alkylating agent molar ratio of from about 0.01 to 20:1 or more, preferably about 2 to 10:1.

It is preferred that an increasing temperature gradient be employed in the alkylation process of the present invention and includes initially contacting the reactants in the presence of the catalyst at a relatively low reaction temperature, generally from about 400 to 600° F., and sufficient to provide substantial utilization of the alkylating agent, for instance at least a utilization of about 40 to 50 percent. The rate for the increasing temperature gradient will generally range from about 1 to 20° F., preferably from about 1 to 10° F., temperature increase per hour on stream, up to a temperature generally of about 700 to 900° F. The temperatures and rate of temperature increase will depend upon the particular reactants and catalysts employed.

The aromatics, e.g., alkylatable aromatic hydrocarbons, suitable for alkylation in the present process include mono- and polycyclic aromatic hydrocarbon compounds such as benzene and its lower alkyl homologues, e.g., toluene and the xylenes, naphthalene, and indane, which may be substituted or unsubstituted. The substituted aromatic compounds must, however, contain at least one hydrogen attached to the aromatic nucleus and are preferably methyl-substituted. These compounds may correspond to the general formula

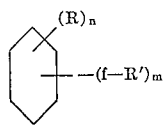

where R is an alkyl, including cyclo alkyl, radical containing generally from about 1 to 20, preferably from about 1 to 8, carbon atoms; $n$ is 0 to 5, preferably 1 to 3; R' is an aromatic hydrocarbon ring, preferably $C_4H_4$; —f— indicates a fused ring relationship (two carbon atoms common to two aromatic nuclei, e.g., as in naphthalene); and $m$ is generally 0 to 1 or more. R may also be a divalent hydrocarbon group attached to the aromatic ring at two carbon atoms of the ring, e.g., alkylene, as in decalin and tetralin. The preferred aromatics, however, include benzene and alkyl benzenes corresponding to the above formula when $m$ is 0. The aromatic rings and R groups may be substituted as with phenyl, hydroxy, alkoxy, halide and other radicals which do not prevent the desired reaction. Suitable aromatic hydrocarbons include benzene, toluene, ortho-xylene, meta-xylene, para-xylene, ethyl-benzene, ortho-ethyl-toluene, meta-ethyltoluene, para-ethyltoluene, 1,2,3-trimethylbenzene, 1,2,4-trimethylbenzene, 1,3,5-trimethylbenzene or mesitylene, normal propylbenzene isopropylbenzene, etc. Higher molecular weight alkylaromatic hydrocarbons are also suitable as starting materials and include aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to about $C_{18}$. Other suitable alkylatable aromatic hydrocarbons include those with two or more aryl groups such as diphenyl, diphenylmethane, triphenyl, triphenylmethane, fluorene, stilbene, etc. Examples of other alkylatable aromatic hydrocarbons containing condensed benzene rings include naphthalene, alpha-methylnaphthalene, beta-methylnaphthalene, anthracene, phenanthrene, naphthacene, rubrene, etc. Indane is another. The above alkylatable aromatics can be used alone or in mixtures.

The alkylating agents suitable for use in the present process include organic compounds containing an alkyl, including cycloalkyl, radical which is transferable to the aromatic nucleus. These compounds are aliphatic and include alkyl halides, alkanols and ethers generally containing from about 1 to 20 carbon atoms, preferably from about 1 to 6 carbon atoms, and also contain a radical, e.g., a hydroxyl or ether radical, which will displace a nuclear hydrogen of the aromatic through condensation. The alkylation agent is preferably saturated and frequently contains oxygen which produces water during the alkylation reaction.

A number of suitable alkylating agents correspond to the general formula

R—O—R' where R is a monovalent hydrocarbon radical such as alkyl, including cycloalkyl, usually lower alkyl and preferably containing 1 to 4 carbon atoms and R' is hydrogen or R, such as a lower alkyl radical and preferably containing 1 to 4 carbon atoms. The alkylating agents usually do not have more than about 18 carbon atoms, preferably up to about 12 carbon atoms. Specific alkylating agents include alkanols such as ethanol, propanol, isopropanol, pentanol, octanol and preferably methanol; and alkyl ethers such as dimethyl ether, diethyl ether and like members whether substituted with non-interfering groups or not. When the alkanols are employed, they may go through an intermediate ether stage. Examples of alkyl halides which may be used are of the formula RX, where R is as noted above and X is halogen and include ethyl chloride, normal propyl chloride, isopropyl chloride, normal butyl chloride, isobutyl chloride, secondary butyl chloride, tertiary butyl chloride, amyl chlorides, hexyl chlorides, etc., ethyl bromide, normal propyl bromide, isopropyl bromide, normal butyl bromide, isobutyl bromide, secondary butyl bromide, tertiary butyl bromide, amyl bromides, hexyl bromides, etc., ethyl iodide, normal propyl iodide, etc.

The following examples will serve to illustrate the invention but they are not to be considered limiting.

EXAMPLES I AND II

The examples were conducted according to the following procedure. A 1-inch internal diameter Universal stainless steel reactor heated by radiant heat and bronze-block furnace was employed. The temperature of the reactor was controlled by Fenwall thermostats and the temperature of the catalyst bed was measured by means of Iron-Constantan thermocouples located throughout the bed.

Ortho-xylene and methyl alcohol were blended in the indicated ratio and charged to the reactor from a graduated blowcase by nitrogen (diluent gas) placement. Both the diluent gas and the liquid feed were metered to the reactor through Fischer-Porter rotameters.

The liquid products were separated from the effluent gases in a Jerguson liquid-level gauge and then released to atmospheric pressure at room temperature. The volume of dry gas was measured by means of a wet test meter and spot and continuous gas samples were taken. The gas samples were analyzed by mass spectrometer techniques. Total hydrocarbon analyses were by vapor phase chromatography. The examples were conducted under the conditions specified in Table I with and without chromia as a catalytic component. The results for each of the examples are also presented in this table.

Table I

[Standard Conditions: 700° F., 100 p.s.i.g., 0.25 WHSV]

| Example | I | II |
|---|---|---|
| Run No | 720–73 | 1063–5 |
| Hrs. on Stream | 22 | 20 |
| Catalyst | (1) | (2) |
| Arom./MeOH | 2/1 | 1/1 |
| C lbs. of Product | 8.22 | 8.42 |
| Methanol Utilization | 44 | 45 |
| Carbon on Catalyst, Wt. Percent | 15.7 | 5.75 |

1 Socony $SiO_2$-$Al_2O_3$ (contains approximately 12% by weight of $Al_2O_3$).
2 32% $Cr_2O_3$ on Socony $SiO_2$-$Al_2O_3$.

When an aromatic and methanol are processed over conventional silica-alumina catalysts under methylation conditions high methanol utilizations are obtained coupled with a high coking rate. This necessitates frequent regenerations at about six-hour intervals even though methylation activity has not dropped to low level. (Table I.) However, when high percentages of chromia, at least about 20%, are incorporated upon an active silica-alumina high methanol utilization is maintained and a low coking rate is obtained at higher methanol ratios (Run 1063–5). This lower coking rate gives a cycle time of twelve to twenty-four hours depending upon the methanol ratio employed.

The cycle time of these catalysts can be extended by employing a temperature-time gradient reactor. During normal operation methylation is conducted at a constant optimum temperature. By operating in this manner methanol utilization decreases with time or carbon laydown on catalyst. Also, carbon laydown on catalyst increases with increasing temperatures. Thus, the methylation reaction can be initiated at the lowest temperature that gives maximum methanol utilization and the temperature slowly raised at a rate such that utilization remains constant. When the normal operating temperature is reached methanol utilization has remained constant at the maximum value and carbon laydown on catalyst is below that value reached by operating at a constant temperature. The reaction is continued by slowly increasing the temperature beyond the normal operating temperature till the maximum coke level (e.g. 6%) on catalyst is reached. An example of this type of operation is given in Tables II and III.

*Table II*

[Standard Conditions: 700° F., 100 p.s.i.g., 0.20 WHSV, 1 o-xylene MeOH. Catalyst: 32% $Cr_2O_3$/Socony $SiO_2$–$Al_2O_3$]

| Hours on Stream | 1 | 5 | 8 | 12 | 15 | 20 | 0–20 |
|---|---|---|---|---|---|---|---|
| Methanol Utilization | 59 | 59 | 55 | 51 | 40 | 36 | 45 |
| Carbon on Cat., Wt. Percent | 1.2 | | | | | | 5.75 |

*Table III*

[Conditions: 600–700° F., 100 p.s.i.g., 0.23 WHSV, 2 o-xylene/1 MeOH. Catalyst: 32% $Cr_2O_3$/Socony $SiO_2$–$Al_2O_3$]

| Hours on Stream | 1 | 5 | 9 | 13 | 15 | 0–15 |
|---|---|---|---|---|---|---|
| Temperature, ° F | 610 | 640 | 675 | 690 | 705 | 600–700 |
| Methanol Utilization | 70 | 70 | 74 | 68 | 60 | 70 |
| Carbon on Catalyst, Wt. Percent | | | | | | 3.54 |

In the case of the 32% $Cr_2O_3$/$SiO_2$–$Al_2O_3$ catalyst the best operating temperature was indicated to be about 700° F. By initiating the methylation reaction at 610° F. and raising the temperature about 5° F. per hour, maximum methanol utilization is maintained and a lower carbon laydown on catalyst is obtained. When 700° F. is reached coke on catalyst is below that normally obtained by operation at 700° F. Operating temperature can be increased at 5° F. per hour to 800° F. or higher or until a maximum coke on catalyst of 6 weight percent is reached and still maintain a constant methanol utilization.

EXAMPLES III TO V

The examples summarized in Table V are included to show that increasing the percentages of other metal oxides on silica-alumina substantially reduces methanol utilization.

*Table V*

[Standard Conditions: 700° F., 100 p.s.i.g., 0.25 WHSV, 1 o-xylene/1 MeOH]

| Example | | III | IV | V |
|---|---|---|---|---|
| Run No | 720–48 | 1063–3 | 1063–13 | 1063–12 |
| Catalyst | (1) | (2) | (3) | (4) |
| Methanol Utilization | 54 | 56 | 53 | 17 |
| Carbon on Cat | 2.6 | 1.2 | 3.3 | 2.9 |

1 Socony $SiO_2$–$Al_2O_3$.
2 32% $Cr_2O_3$ on Socony $SiO_2$–$Al_2O_3$.
3 2% $MoO_3$ on Socony $SiO_2$–$Al_2O_3$.
4 10% $MoO_3$ on Socony $SiO_2$–$Al_2O_3$.

EXAMPLE VI TO XI

Essentially the same procedure employed in Example I is followed except in Example I the alkylating agents and aromatics listed below in their respective examples are substituted for the methanol and/or o-xylene of Example I.

| Example | Alkylating Agent | Aromatic |
|---|---|---|
| VI | Dibutyl ether | Benzene. |
| VII | Butanol | Naphthalene. |
| VIII | Methanol | Indane. |
| IX | t-Octanol | Toluene. |
| X | t-Butyl chloride | o-Xylene. |
| XI | Methyl ether | o-Xylene. |

We claim:

1. A process for the alkylation of aromatics with an alkylating agent which comprises contacting an alkylatable aromatic with an alkylating agent under alkylation conditions including a temperature of about 400 to 1000° F. and in the presence of a catalyst consisting essentially of about 25 to 50 weight percent chromia on a silica-alumina support.

2. The process of claim 1 wherein the silica-alumina is a synethetic gel silica-alumina.

3. The process of claim 2 wherein the alkylatable aromatic hydrocarbon corresponds to the structural formula:

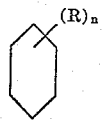

where R is an alkyl radical containing from about 1 to 8 carbon atoms and $n$ is 1 to 3.

4. The process of claim 3 wherein the alkylating agent is an alkanol of 1 to 6 carbon atoms.

5. The process of claim 4 wherein is employed an increasing temperature gradient of about 1 to 20° F. per hour on stream in a temperature range of from about 400 to 600° F. up to about 700 to 900° F.

References Cited by the Examiner

UNITED STATES PATENTS

| 2,383,179 | 8/45 | Egloff | 260—671 |
| 2,419,599 | 4/47 | Schulze | 260—671 |
| 2,500,197 | 3/50 | Michael et al. | 260—671 |
| 2,691,647 | 10/54 | Field et al. | 260—671 |
| 2,913,398 | 11/59 | Riblett et al. | 208—136 |

ALPHONSO D. SULLIVAN, *Primary Examiner.*